INVENTORS.
MARK E. CAMPBELL
GEORGE E. O'BRIEN
BY EUGENE E. PENTECOST

AGENT

Feb. 21, 1961 M. E. CAMPBELL ET AL 2,972,195
GYRO COMPASS
Filed June 6, 1958 6 Sheets-Sheet 2

FIG. 3

INVENTORS.
MARK E. CAMPBELL
GEORGE E. O'BRIEN
BY EUGENE E. PENTECOST

*Louis J. Knobbe*
AGENT

INVENTORS.
MARK E. CAMPBELL
GEORGE E. O'BRIEN
BY EUGENE E. PENTECOST

AGENT

INVENTORS.
MARK E. CAMPBELL
GEORGE E. O'BRIEN
BY EUGENE E. PENTECOST

AGENT

United States Patent Office 2,972,195
Patented Feb. 21, 1961

2,972,195
GYRO COMPASS

Mark E. Campbell, Whittier, George E. O'Brien, Covina, and Eugene E. Pentecost, Long Beach, Calif., assignors to North American Aviation, Inc.

Filed June 6, 1958, Ser. No. 740,329

26 Claims. (Cl. 33—226)

This invention relates to direction determining apparatus, and in particular to gyro compasses for measuring directions in azimuth. The invention further relates to gyro compasses adapted for measuring earth latitude.

A long-time need has existed for a field compass which is portable, quick and easy to operate and above all, highly accurate. Military equipment such as missile launchers and mobile radars require the azimuth direction to be known with high accuracy.

In the present state of the art there are three known methods for primary determination of azimuth directions, namely the magnetic compass, celestial observations, and gyro compasses. Magnetic compasses do not provide the required accuracy because of large local declinations, variations, and deviations, and even excessive diurnal variations in declination at a given location. Celestial observation is a fundamental means of determining direction, but is a very time-consuming process for any degree of accuracy required. Additional limitations on this method are that the time must be accurately known and further that the skies must be clear. Present-day commercial gyro compasses, even under ideal conditions, do not have the required degree of accuracy. The usefulness of these present-day gyro compasses is further limited in that the ideal operating conditions require an extremely long period of warm up, as much as a working day. These gyroscopes are also so large as not to be portable in any reasonable sense of the term.

Accordingly, it is an object of this invention to provide an improved azimuth direction measuring apparatus.

It is another object of this invention to provide an improved gyro compass.

It is still another object of this invention to provide a gyro compass which is fundamentally capable of an accuracy comparable with celestial alinement equipment.

A further object of this invention is to provide a gyro compass which attains the desired accuracy within a manner of minutes, i.e., a warm up time in the order of 15 minutes.

It is another object of this invention to provide a gyro compass having the same sort of portability as regards size and weight, independence from power lines, etc. as ordinary surveying equipment.

It is still another object of this invention to provide a gyro compass in which the accuracy of the gyroscope is enhanced by compensating for error torques acting on the gyroscope.

A further object of this invention is to provide a highly accurate azimuth direction measuring apparatus operative without regard to location or time of day.

It is another object to provide an improved latitude determining apparatus.

Other and further objects, features and advantages of the invention will become apparent as the description proceeds.

Briefly, in accordance with a preferred form of the present invention, a single-axis gyro senses the space rate of rotation of the gyro about a particular axis (the input axis) orthogonal to the gyro spin and output axes when the input axis is constrained to lie in a plane tangent to the geoid. Suitable indicator means show whether or not the gyroscope is experiencing a rotation about that axis. If such a rotation is indicated, the position of the gyroscope with respect to the earth is shifted by an appropriate change in azimuth direction. An azimuth setting may thus be located at which the gyroscope rotation about its input axis is essentially zero. As hereinafter shown, in this position the gyro input axis must be aligned with the east-west cardinal azimuth. This invention permits extremely accurate azimuth measurements to be made by providing apparatus for measuring and cancelling the effect of error torques acting upon the gyro output axis.

A more thorough understanding of the invention may be obtained by a study of the following detailed description taken in connection with the accompanying drawings in which.

Figure 1:
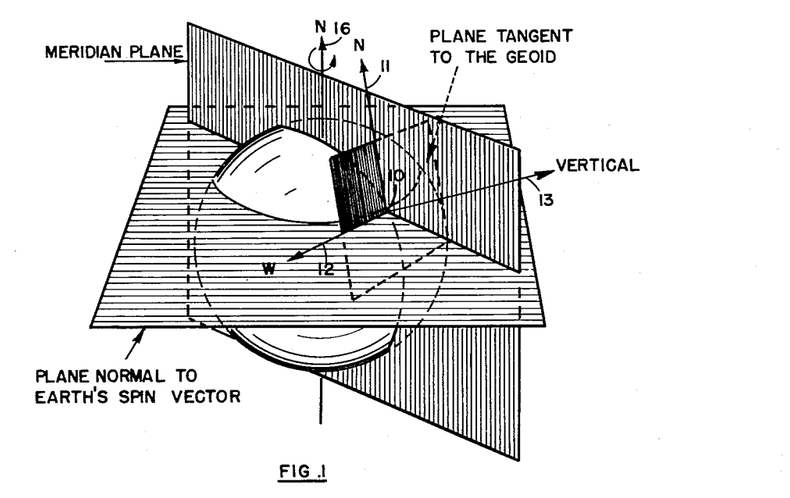
Fig. 1 illustrates the definition of true direction on the geoid.

Fig. 1 illustrates the definition of true direction on the earth. A true east-west line 12 is defined as the intersection of a plane tangent to the geoid with a plane normal to the earth spin vector 16. A third plane (a meridian plane) shown in Fig. 1 is defined by the earth spin vector 16 and the point 10. An earth vertical 13 lies in the meridian plane and is perpendicular to the plane tangent to the geoid. In practice, this earth vertical is located either as the normal to a free liquid surface of finite, but small area; by the line of suspension of an undisturbed plumb-bob; or by the proper interpretation of the readings of bubble levels. A gravitational anomaly, however, will introduce a small error in locating the earth vertical by these means. If the amount and direction of this gravitational anomaly is known, the error in direction can be predicted. Normal to the true east-west line 12 at point 10 and lying in the plane tangent to the geoid is a true north-south line 11.

Figure 2:
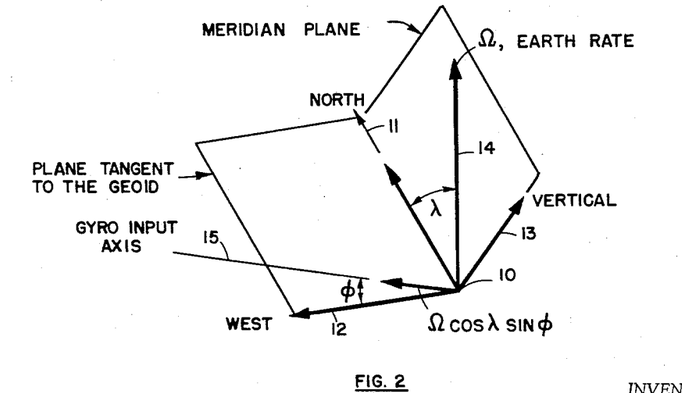
Fig. 2 illustrates how the space rate of rotation of a gyroscope about its input axis may be derived.

Fig. 2 illustrates how a gyroscope sensitive to rotation about a particular axis (input axis) may be utilized to measure earth rotation. The plane tangent to the geoid, the meridian plane, and lines 11, 12 and 13 are the same as those illustrated in Fig. 1. The rate of rotation of the earth in space, $\omega$, can be visualized as a vector 14 lying in the plane containing the earth's spin vector (the meridian plane) and making an angle $\lambda$ with the true north-south line 11. The northerly component of the earth rate is therefore $\Omega \cos \lambda$, as shown. The input axis of the gyroscope is shown as line 15 lying in the geoid tangent plane, and making a small angle $\phi$ with a true east-west line 12. The component of earth rate lying along the gyro input axis 15 is equal to $\Omega \cos \lambda \sin \phi$. As $\phi$ is made zero by an adjustment in azimuth of the gyro input axis 15, the gyro indication of an earth rate component about the input axis will decrease until the alinement of the gyro input axis with the east-west line 12 is achieved. As noted, the component of earth rate along the gyro input axis is proportional to $\cos \lambda$. The term $\lambda$ varies with the astronomical latitude of point 10. As would be expected, the accuracy and time of alinement for this invention are, therefore, affected by the latitude of operation.

Figure 3:
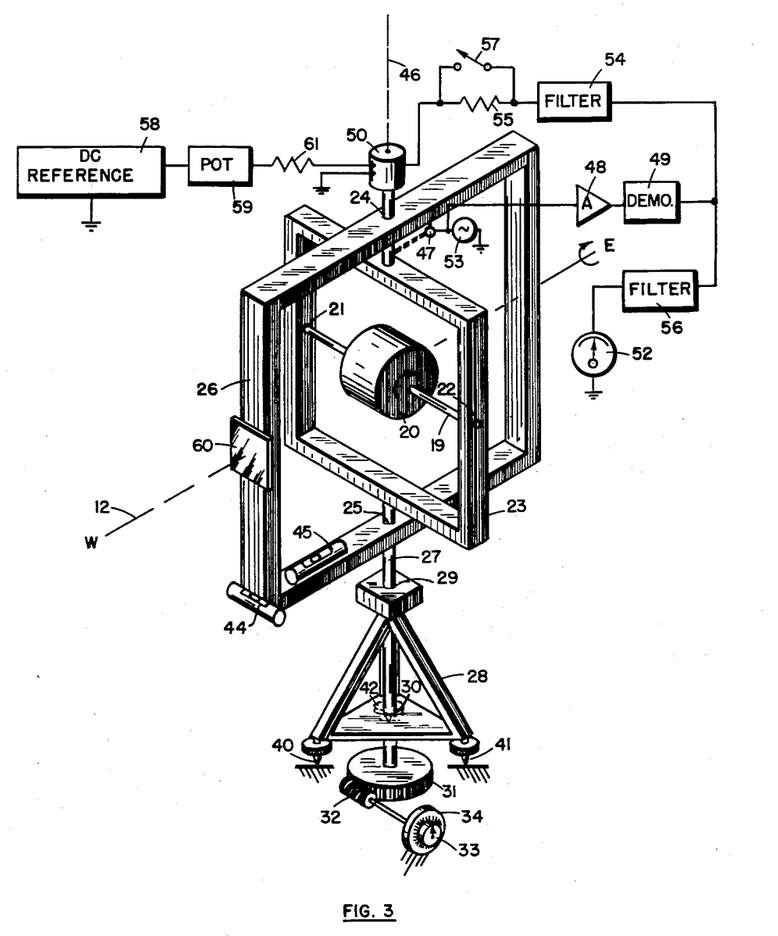
Fig. 3 illustrates one embodiment of this invention.

Fig. 3 illustrates schematically one embodiment of this invention. The rotor axis 19 supports rotor 20 in bearings 21 and 22. Bearings 21 and 22 define the gyro spin axis. Power means (not shown in this figure) of any suitable type are provided for driving rotor 20. Bearings 21 and 22 are supported by gimbal 23. Gimbal 23 is free to rotate in bearings 24 and 25 contained in gyroscope case 26. Affixed to gyroscope case 26 is axle 27 rotatably mounted via bearings 29 and 30 on base frame 28. Azimuth adjusting means may include a worm gear 31 and worm 32 connected to rotate axle 27. Azimuth adjusting screw 33 is affixed to worm 32 for varying the azimuth position of gyroscope case 26. The base 28 and case 26 in practice will be joined securely enough so that when the azimuth adjusting screw 33 is unrotated, the case 26 may be assumed to be in rigid relation to the earth in one azimuth position. The output axis 46 is defined by the bearings 24 and 25. In the typical embodiment of this invention as shown in Fig. 3, it is desirable to avoid torques generated by a component of gravity acceleration normal to the output axis, due to any residual mass unbalances which may exist in the gyro. In order to avoid these torques, it is necessary that this output axis be located parallel to an earth vertical, i.e., alined with line 13 previously shown in Figs. 1 and 2. This alinement is accomplished with a plurality of leveling screws 40, 41 and 42. Two bubble levels 44 and 45 will ordinarily provide the necessary information for alining the output axis in a vertical position.

Several commercially available gyroscopes may be utilized for the gyroscope illustrated schematically in Fig. 3. A preferred gyroscope for this application is described in application, Serial No. 259,192 entitled, Flotation Gyroscope," filed November 30, 1951, by J. M. Slater et al. and assigned to North American Aviation, Inc., assignee of the present invention.

The input or reference axis of the gyroscope illustrated in Fig. 3 is defined as being orthogonal to both the spin axis and the output axis and is illustrated as line 12. Because of a gyroscope's property of precession, a rotation of the gyro case 26 about the input axis 12 is resisted and instead, a rotational displacement of the gimbal 23 with respect to case 26 occurs about the output axis 46. As described above and illustrated in Fig. 2, the true east-west cardinal azimuth may be detected by noting the azimuth position in which the component of earth rate lying along the gyro input axis is zero. Referring again to Fig. 3, pickoff 47 is suitably energized by power supply 53 so as to provide an output signal proportional in amplitude to the rotational displacement of gimbal 23 with respect to case 26 and indicating by phase or sign of the signal the direction of such displacement. Pickoff 47 may be any one of several types well known in the art. The output signal from pickoff 47 is suitably amplified in amplifier 48 and demodulated in demodulator 49. The output of demodulator 49 is connected to a torquer 50 adapted to apply a torque to gimbal 23 about the output axis 46. Resistor 55 and shunting switch 57 in series with torquer 50 provide a means for obtaining a low resolution torquer (switch 57 closed) or a high resolution torquer (switch 57 open). A filter 54 is also preferably in circuit with torquer 50. The output of the demodulator 49 is also connected to an indicator 52 via filter 56. The circuits just described are completed by respectively grounding terminals on torquer 50 and the indicator 52.

In operation, the gyro case 26 is adjusted in increments about axis 27 by rotating the azimuth adjusting screw 33 until the gimbal displacement detected about the output axis is zero. At any other azimuth position, pickoff 47 will sense a minute displacement of the gimbal 23 with respect to the case 26 thereby producing a torque acting on the gimbal 23 about the output axis via the feedback circuit including torquer 50. Indicator 52 continuously indicates the magnitude of the required restraint. At such time as a null condition is achieved for the indicator 52, the operator of the gyro compass is informed that no displacement is being measured about the gyro output axis, thus indicating that the input axis of the gyroscope is approximately alined with an east-west line. This operation will give only an approximate east-west line because of error bias torques acting about the output axis of the gyroscope.

A very important feature of this invention is the provision of apparatus for measuring and cancelling internal bias torques acting upon the gyro about its output axis. These extraneous disturbing torques are common to all gyroscopes and are attributable to imperfections in the gimbal bearings, mechanical stresses in electrical connections, residual unbalance acted upon by gravity, convection torque in the flotation fluid, the action of the earth's magnetic field on permeable material in the gimbal, etc. The torques cause an erroneous indicated rotation rate about the gyro input axis which is indistinguishable from the earth rate. An error is thus caused in the measurement of the earth rate (and accordingly an error is introduced in the azimuth measurement) unless the effect of these disturbing torques is cancelled.

Initially, a "coarse bias adjustment" is effected by energizing all portions of the gyro compass with the exception of the gyro rotor 20. Switch 57 is open thereby providing a relatively high resolution torquing means. Direct-current source 58, in conjunction with potentiometer 59, and resistor 61 is used to supply power to torquer 50 so as to adjust the torque acting on the gimbal 23 until the indicator 52 gives a null indication. In this condition, the torque exerted on the gimbal by torquer 50 exactly balances the internal bias torques acting on the output axis 46 due to fluid forces, electrical conductors, magnetic fields, and the like other than those associated with rotation of the gyro rotor. The coarse bias torque signal stored in potentiometer 59 is applied throughout the succeeding steps.

A "coarse alinement adjustment" is then made so as to approximately aline the gyro input axis with the true east-west line. For this measurement, switch 57 is closed thereby providing a low resolution torquer. After energizing the gyro rotor in either direction, the gyro case 26 is adjusted in increments about axis 27 until the displacement detected about the output axis is zero. At this point, the input axis of the gyro is approximately alined with a true east-west line.

A "fine bias adjustment" provides a measurement of the additional bias torques acting upon the gimbal when the gyroscope rotor 20 is energized. Such torques are primarily caused by vibration and thermal changes. These error torques are measurable by suitably modulating the rotational velocity of rotor 20. A convenient form of velocity modulation involves operating the rotor in opposite spin directions. Switch 57 is opened for this adjustment. With the rotor 20 spinning in one direction, the gyro case 26 is adjusted in increments about axis 27 until the displacement detected about the output axis is zero. The position of the pointer on the azimuth adjusting screw 33 with respect to the scale 34 is then noted. Rotor 20 is then rotated in the opposite spin direction. Again, the gyro case 26 is adjusted about axis 27 until the displacement detected about the output axis is zero. A reading is then noted regarding the relationship of the pointer on screw 33 with respect to scale 34. An average of these two scale readings is then calculated.

A "final alinement adjustment" consists of adjusting azimuth screw 33 so as to line up its pointer at the calculated average reading. With this adjustment, the gyroscope is very accurately alined with a true east-west cardinal azimuth, the effect of the error bias torques having been previously cancelled by the coarse bias torque signal stored in potentiometer 58 and the averaging of the azimuth positions giving zero output axis displacement for opposite directions of rotor spin.

In the circuit hereinbefore described, two levels of resolution for the torquer 50 are preferably provided. In the measurements made for determining the bias torques in the "fine bias adjustment," the displacement of the gimbal may be relatively minute since the gyro input axis is approximately alined with a true east-west line and the earth rate about the input axis will be quite small. The amount of torque required to null the gimbal with respect to the case under these conditions is accordingly small. Likewise, the currents flowing in the feedback circuit are small. Indicator 52 is therefore required to be sensitive to quite low current levels during these bias torque measurements. Contrariwise, the displacement of the gimbal may be quite large during the "coarse alinement adjustment" since the earth rate about the input axis is likely to be substantial (until the gyro case is adjusted in azimuth). Considerably larger currents are required to torque the gimbal to a null position; the indicator 52 under these conditions will be overloaded. In addition, the range of azimuth adjustment in which the meter reads on scale is limited; accordingly the adjustment for null is quite difficult.

Alternative means for avoiding the above problem are to adjust either the sensitivity of the indicator 52 or the sensitivity of the torquer 50. The former means would include merely shunting the indicator 52 with a suitable resistance during the "coarse alinement adjustment." This, of course, decreases the current through the meter and makes it a lower sensitivity meter. The latter means of providing a dual sensitivity torquer is preferred in that it enables the gimbal to be kept closer to null even when the gimbal tends to be displaced a considerable amount. One means of providing such a dual torquer has already been shown in Fig. 3. During the "coarse alinement adjustment" resistor 55 is removed from the torquer circuit; thus, more torque is produced by a given current than when resistor 55 is in series connection with the torquer 50. The currents associated with the "coarse alinement adjustment" are therefore of similar magnitude to those measured during the bias torque measurements. Also, more torque is available when larger gimbal displacements are involved thereby effectively constraining the gimbal in a null position.

The dual range torquer arrangement shown in Fig. 3 comprises a single torquer 50. An arrangement is hereinafter shown which comprises two separate torquing means, one of which is a high resolution torquer and one of which is a low resolution torquer.

In the circuit of Fig. 3 are shown parallel connection of the feedback and indicator circuits. Although this connection is preferable, the indicator 52 could be placed in the feedback loop circuitry. A disadvantage is that filter 56 is utilized for maximum noise filtering whereas filter 54 is designed for optimum dynamic response of the servo loop. These requirements are usually somewhat incompatible, thus making the parallel operation an attractive one since both filters may be adjusted for optimum performance in their respective circuits.

The compensation for bias torques by rotor reversal may be demonstrated mathematically as follows: The parameters used in this analysis and their definitions are—

$M_u$ = error torque acting upon the gyro about its output axis
$\Delta M_1$ = first measurable torque on gyro output axis
$\Delta M_2$ = second measurable torque on gyro output axis
$\omega_e$ = earth rate component in the direction of the gyro input axis
$H_1$ = gyro angular momentum with rotor in a first direction
$H_2$ = gyro angular momentum with rotor in a second opposite direction
$M_S$ = torque applied by servo loop The fundamental equation relating angular velocity of the gyro and the output torque is a very simple one, as follows:

$$M = H\omega \quad (1)$$

where M is the torque, H is the angular momentum of the gyro rotor, and $\omega$ is the angular velocity about the gyro input axis. In the present gyro compass with the rotor spinning in a first direction and the gyro gimbal displaced from a null position, a torque will be applied by the servo loop. The gyro gimbal will rotate about the gyro output axis until it arrives at a condition in which there is no gimbal motion relative to the gyro case (or relative to the earth), i.e., a steady state condition, in which the following equation is satisfied:

$$M_u + \Delta M_1 + M_S = H_1 \omega_e \quad (2)$$

The first measurable torque $\Delta M_1$ is then adjusted until the torque applied by the servo loop is zero at which time the gimbal is at a null position.

Thus:

$$M_S = 0 \quad (3)$$

and from Equation 2

$$\Delta M_1 = H_1 \omega_e - M_u \quad (4)$$

The gyroscope rotor is then operated in a second opposite spin direction and the second measurable torque $\Delta M_2$ is adjusted to make the servo loop torque zero. Thus:

$$\Delta M_2 = H_2 \omega_e - M_u \quad (5)$$

Since the gyro rotor has been reversed in direction:

$$H_1 = -H_2 \quad (6)$$

Substituting Equation 6 into Equation 5 allows the following equation to be written:

$$\Delta M_2 = -H_1 \omega_2 - M_u \quad (7)$$

In the gyroscopes under consideration the disturbing error torques are substantially independent of the rotor's spin direction. Therefore the error torque $M_u$ is assumed to remain constant for either direction of rotor spin. Thus Equation 4 may be added to Equation 7 to give:

$$\Delta M_1 + \Delta M_2 = -2M_u \quad (8)$$

or $$M_u = -\frac{\Delta M_1 + \Delta M_2}{2} \quad (9)$$

Equation 9 reveals that a quantitative measurement of the error torque $M_u$ is possible by averaging the algebraic values of the measured torques $\Delta M_1$ and $\Delta M_2$. In the gyro compass embodiment hereinbefore described, the application of the average torque by a component of earth rotation is accomplished by fixing the azimuth position of the gyro case in the average of the two positions indicated by the torques $\Delta M_1$ and $\Delta M_2$. In a later described embodiment of the gyro compass, an average torque is applied directly to the gyro output axis thereby cancelling the error torque $M_u$.

Figure 4:
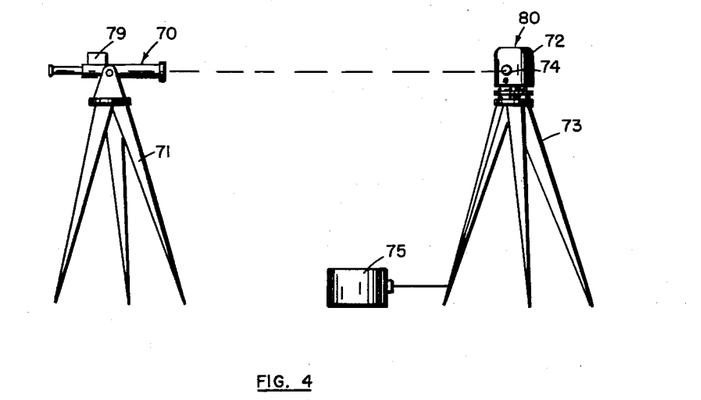
Figs. 4, 5 and 6 are views of an embodiment of this invention as packaged for use in the field.

After the gyroscope is accurately alined with a true east-west cardinal azimuth, the remaining problem, namely that of translating the position of line 12 with respect to the gyro location, is solved by applying known surveying techniques. A convenient readout indicator is mirror 60 attached to the case 26 (Fig. 3) so that the plane of its reflecting surface is parallel to the plane defined by the gyro output and spin axes. Shown in Fig. 4 is a gyro compass system embodying the features of this invention as set up in the field. A theodolite 70, mounted on tripod 71, is equipped with an autocollimating eyepiece 79. The gyroscope previously shown in Fig. 3 is mounted within a case 72 supported by a tripod 73. Case 72 and the gyro mounted therein are hereinafter referred to as an alinement head assembly 80. Mirror 60 is immediately behind an optical window 74. Light rays defining a reticle image are projected from the theodolite 70 and reflected thereto by mirror 60. By making the reticle image coincident with the primary reticle located within the instrument, the instrument is autocollimated on the mirror 60 and precise azimuth positions may be obtained directly from the theodolite 70.

The combination theodolite-autocollimator may be put to additional uses also. Ordinarily, a theodolite is provided with highly accurate bubble levels. Since the mirror 60 is presumed to define the reference direction of the gyroscope, the mirror may be utilized to accurately level the instrument by reference to the precise bubble levels contained in the theodolite. Thus, the levels 44 and 45 on the gyro compass need not be provided, or in the alternative, levels may be retained which are not so highly accurate, they being used merely as an initial level adjustment. The theodolite would be used for a final level adjustment.

An alternative means for determining the direction of the true east-west line is also afforded by the theodolite-autocollimator. As previously noted in the description of Fig. 3, in the "fine bias adjustment" azimuth positions of the gyroscope are noted by the relationship of the pointer on screw 33 with respect to scale 34. These positions could also be measured with the theodolite-autocollimator by carefully determining the direction of the azimuth position of the mirror 60 for each rotor spin direction. An average of the measurements will enable the theodolite to be set to the true east-west cardinal azimuth. This, of course, eliminates the necessity of scale 34, but requires two readings to be made with the theodolite-autocollimator, whereas in the previously described operation only one such reading was necessary.

Also shown in Fig. 4 is an electronics assembly 75 containing the controls and various power supply and amplifier units. An external primary power source (not shown) is the only additional equipment necessary for the operation of this device. As an example of the portability of this gyro compass, the total weight of the alinement head assembly 80, tripod 73 and electronics assembly 75 is approximately 100 pounds. The total volume occupied by these assemblies is approximately 1.5 cu. ft.

Figure 5:
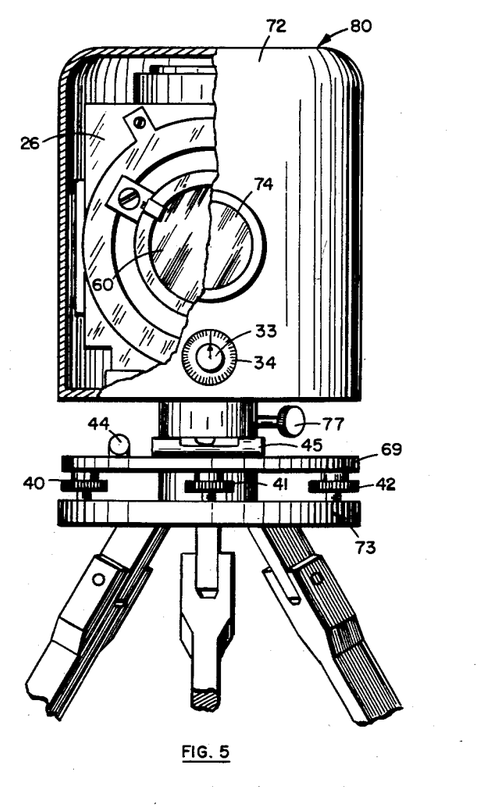
Figure 6:
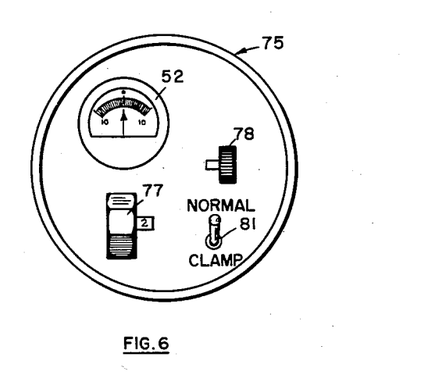
Figure 7:
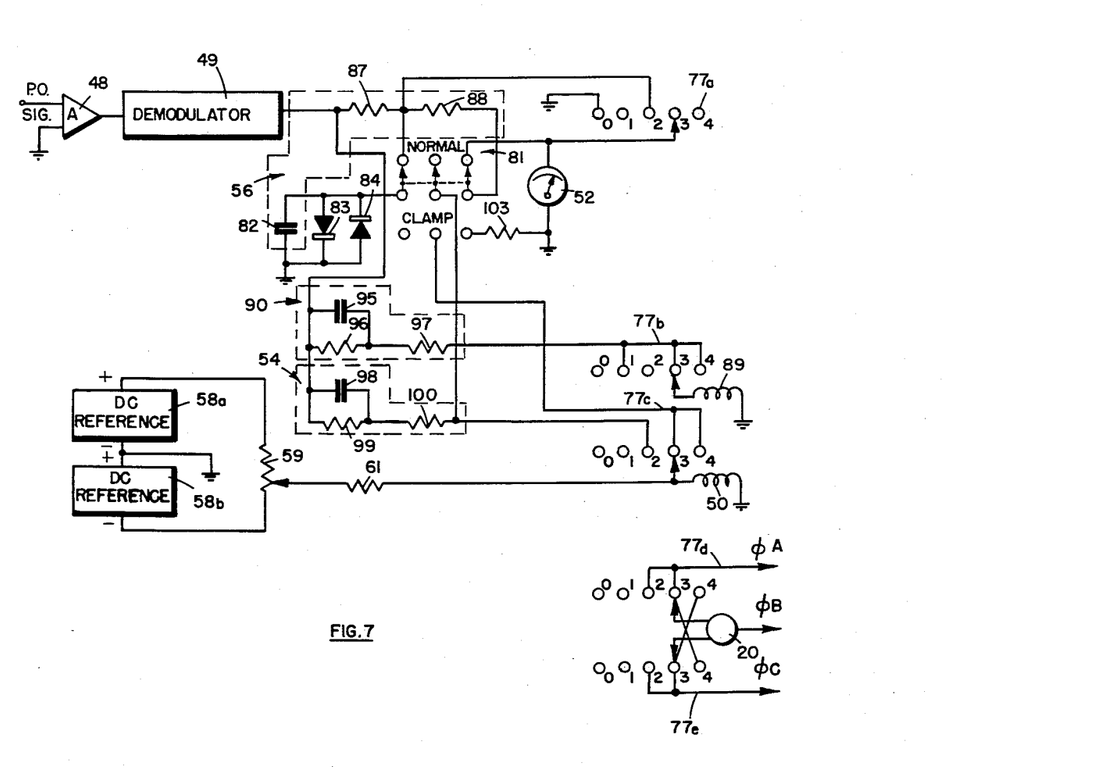
Fig. 7 is a circuit schematic for the embodiment shown in Fig. 3.

The gyro compass hereinbefore described is illustrated in more detail in Figs. 5, 6 and 7.

A cutaway view of alinement head assembly 80 is shown in Fig. 5. Alinement head assembly 80 comprises an outer housing 72 affixed to and enclosing the gyroscope case 26. Housing 72 includes an optical window 74 preferably comprising a circular piece of high-quality glass having flat, parallel surfaces, coated for maximum light transmission. Mirror 60 is permanently and rigidly affixed to the outside of the gyro case 26, as shown. The gyroscope is mounted within the housing 72 so as to locate mirror 60 directly behind the optical window 74. Housing 72 is rotatably mounted on table 69. Affixed to table 69 are the bubble levels 44 and 45. Table 69 is supported at three points on tripod 73 by the level adjusting screws 40, 41 and 42. Azimuth adjusting screw 33 is connected by suitable gearing so as to rotate case 72 with respect to table 69. As shown, the azimuth adjusting screw 33 and scale 34 are conveniently located on the outside of the housing 72. An azimuth clamp 77 allows the housing 72 to be rigidly locked with the tripod 73.

The control panel located on the face of the electronics assembly 75 is shown in more detail in Fig. 6. Located on the control panel are a multiple position switch 77, adjusting knob 78 controlling the potentiometer 59, indicator 52 and an indicator control switch 81. The indicator control switch has alternative positions of "Normal" and "Clamp." The "Normal" position is used for all measurements of gimbal displacement by noting deflection of the indicator 52; the "Clamp" position is used when external adjustments are made to the alinement head assembly 80 and during the period in which the gyro rotor is being brought to speed in either direction of spin.

Fig. 7 is a circuit schematic illustrating in more detail some of the circuitry previously shown in Fig. 3 and also the modification hereinbefore noted of including separate high and low resolution torquers. The pickoff signal from pickoff 47 (Fig. 3) is amplified in amplifier 48 and demodulated in demodulator 49. Switch 77 comprises a multiple-level switch having five contact position on each level. In the "off" or 0 position, level 77a grounds the indicator 52. The remaining switch levels (77b, 77c, 77d and 77e) are not utilized in the "off" position.

In switch position 1, the "coarse bias adjustment" position, the indicator 52 is connected to the output of demodulator 49 through filter 56 which includes resistors 87 and 88 and capacitor 82. Switch levels 77a, 77c, 77d and 77e are not utilized in the switch position 1. The indicator control switch 81 is assumed to be in the "normal" position. Filter 56 is designed to provide a long time constant with maximum noise filtering. Diodes 83 and 84, oppositely poled and connected in parallel with capacitor 82, limit the voltage drop across capacitor 82 to a predetermined value so as to prevent overloading of the indicator 52. Level 77b of the multiple position switch serves to connect a separate high resolution torquer 89 to the output of the demodulator 49 through filter 90 at switch position 1. Torquer 89 is mounted so as to rotate the gimbal 23 with respect to the case 26 as was the torquer 50 shown in Fig. 3. Filter 90 includes resistors 96 and 97 and capacitor 95.

Independent of switch 77, the low resolution torquer 50 is connected directly to a direct-current reference including a pair of direct-current sources 58a and 58b. Potentiometer 59 is connected between this source of positive and negative direct-current potential. The output of potentiometer 59 is connected to the torquer 50 through resistor 61. As previously noted, in the "coarse bias adjustment," a measurement of error torques is accomplished by energizing all portions of the gyro compass with the exception of the gyro rotor 20. The voltage from the pickoff 47 causes a current in the indicator 52 and a current in the torquer 89. The current in torquer 50 may be adjusted by means of the potentiometer 59 until the gyro pickoff signal goes to zero, at which time the indicator will also show zero, giving evidence that the current in torquer 89 is also zero.

Indicator control switch 81 as heretofore noted includes a "clamp" position which provides a means for disconnecting the indicator 52 when external adjustments are being made to the alinement head assembly 80 and during the period in which the rotor is being reversed. Switch 81 (in the "clamp" position) also provides a feedback signal to the torquer coil 50 so as to maintain the gimbal 23 at substantially a null position with respect to the case 26 during such periods of adjustment and rotor reversal. As shown in Fig. 7, in the clamp position of the switch 81, and in all positions of switch 77 except position 2 discussed below the indicator 52 is disconnected from the circuits. Capacitor 82 is also disconnected from the circuits when switch 81 is in the clamp position so as to obviate recharging the capacitor 82 each time switch 81 is thrown from the clamp to the normal position. The switch 81 (in the "clamp" position) further provides a connection from the output of the demodulator 49 to the torquer 50 during switch positions 3 and 4 (not switch level 77c). Thus, current flows in the torquer 50 from the output of the demodulator so as to maintain the gyro gimbal 23 at a null position, i.e., an external torque applied by torquer 50 is directly applied to the gimbal 23 so as to maintain it in null position during external adjustments in azimuth and periods in which rotor 20 is reversed. A resistor 103 is connected between resistor 88 and ground by switch 81 in the clamp position thereby maintaining the impedance characteristics of the circuit when the indicator 52 is disconnected. Thus, resistor 103 has a resistance equal to that of the internal resistance of indicator 52.

Switch position 2 on multiple position switch 77 is utilized for the "coarse alinement adjustment." In level 77a, resistor 88 of filter 56 is shorted out. As previously noted, for the "coarse alinement adjustment" a low resolution torquer is utilized. Level 77b of the multiple position switch (connected to torquer 89) is therefore disconnected in switch position 2. Torquer 50 is connected to the output of demodulator 49 through filter 54 comprising resistors 99 and 100 and capacitor 98. Both of the filters 54 and 90 are designed for optimum dynamic response of the servo loop. Switch levels 77d and 77e connect rotor 20 to a three-phase power supply. The operation of the gyro compass for position 2 may be summarized as follows: A voltage from the gyro pickoff 47 causes a current in the indicator 52 and a current in torquer 50. The current in the indicator 52 for a given voltage in the output of the demodulator is increased for this position since resistor 88 is bypassed. The gyro case 26 is rotated in azimuth until a zero indication of the indicator 52 shows that no current is being provided to torquer 50 through filter 54.

Switch positions 3 and 4 of switch 77 are utilized for the "fine bias adjustment." For these positions, switch level 77a is not utilized. Switch level 77b connects the torquer 89 to the output of the demodulator 49 through filter 90. Switch level 77c disconnects torquer 50 from the servo loop (except for the previously described situation in which the switch 81 is in the clamp position). Switch levels 77d and 77e provide for a reversal of the gyro rotor 20 by reversing phases A and C of the three-phase power supply for respective switch positions 3 and 4. The operation of the gyro compass for switch positions 3 and 4 may be summarized as follows: With the rotor spinning in one direction in position 3, the gyro case 26 is adjusted about axis 27 until the precession detected by the indicator 52 is zero. At such indication, the current to torquer 89 can also be assumed to be zero. In switch position 4, the rotor 20 is rotated in the opposite direction and again the gyro case 26 is adjusted until the precession detected by the indicator 52 is zero. For each of the switch positions 3 and 4, a reading is taken regarding the position of the azimuth adjusting screw 33. As hereinbefore noted, an average of these readings enables the gyroscope to be very accurately alined with a true east-west cardinal azimuth.

In the circuit shown in Fig. 7, the high resolution torquer 89 and low resolution torquer 50 may comprise two separate torque motors, or two separate torquer coils in the same torque motor. Either way, the use of two separate torquers provides for convenient control of the electrical torque-producing currents for two different levels of torquer resolution, and also for the independent adjustment of internal bias torques.

Referring again to Fig. 7, the indicator 52 could be connected in the same circuit as torquer 89 (or torquer 50 for switch position 2) since the steady-state current through the indicator is proportional to the steady-state current through the in-circuit torquer since both currents are caused by the same demodulator output voltage. However, the parallel arrangement of the circuits, as shown, makes it possible to adjust the filter in each for optimum performance, i.e., filter 56 in the indicator circuit can provide a long time constant with maximum noise filtering while filters 54 and 90 in the torquer circuit can be adjusted for optimum dynamic response of the servo loop.

Figure 8:
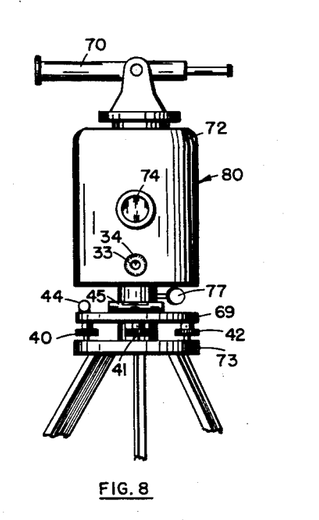
Fig. 8 illustrates another embodiment of this invention.

An alternative embodiment of the alinement head assembly is illustrated in Fig. 8. In this embodiment, the theodolite 70 is affixed directly to the housing 72. If the theodolite azimuth scale is accurately alined with the input axis of the gyroscope, the theodolite telescope can be adjusted to point in any required direction relative to the input axis if appropriate scales and means of adjustment are provided. In this embodiment, the autocollimator 79 is unnecessary in that the telescope may be alined with any local geographical mark. The retention of the mirror 69 is not necessary in this embodiment. However, its retention may be dictated by the fact that it provides a convenient means for checking the alinement of the theodolite scale with the gyro input axis.

Equation 9, previously derived, revealed that a quantitative measurement of the error torque $M_u$ can be accomplished by averaging the algebraic values of the measured torques $\Delta M_1$ and $\Delta M_2$. This average torque can be applied by positioning the gyroscope case in the azimuth position indicated by the average of the null-indication positions for the two directions of spin. This method was used in the embodiments previously shown in Fig. 3 and Fig. 7. In the embodiment of the gyro compass hereinafter described the application of the average torque is provided electrically by storing a quantitative measure of the torques $\Delta M_1$ and $\Delta M_2$ and applying their average directly to the gyro output axis in the "final alinement adjustment."

Figure 9:
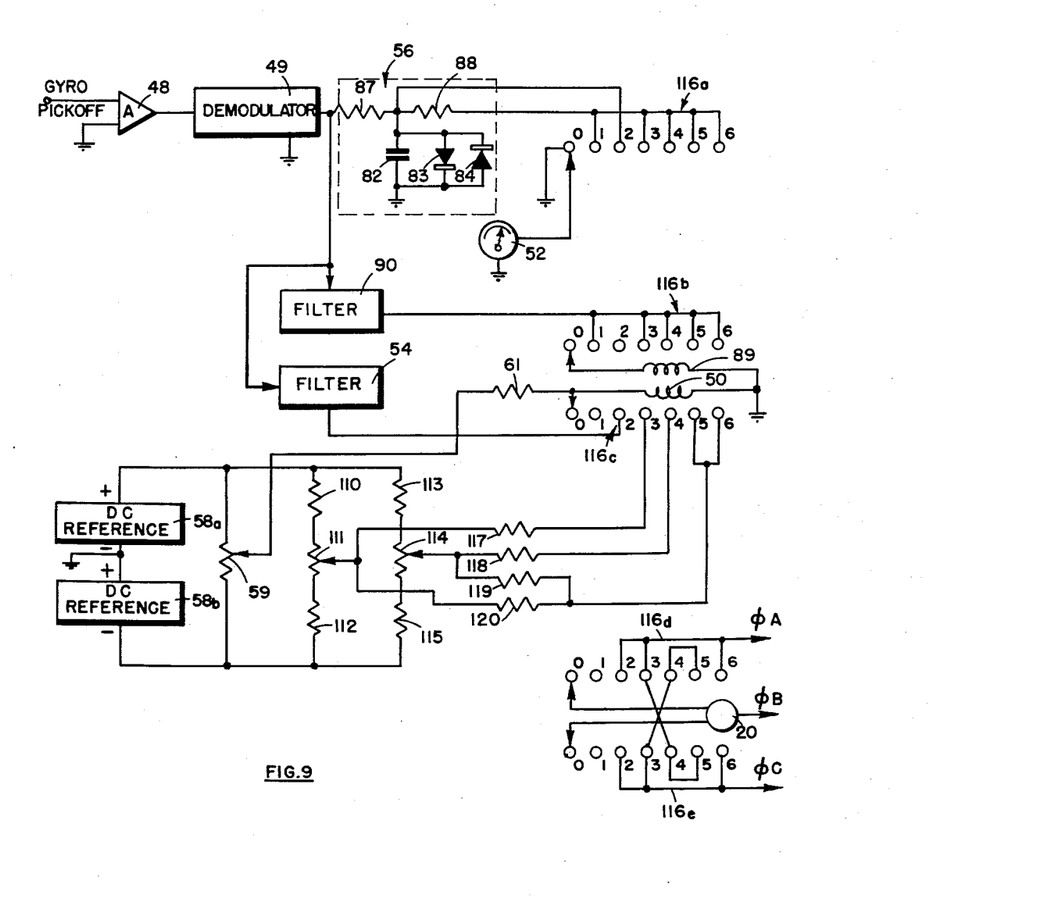
Fig. 9 is a schematic diagram of a circuit for another embodiment of this invention.

Referring now to Fig. 9, a circuit schematic is shown of the modified embodiment of the gyro compass. The gyroscope used in this embodiment and part of the circuitry may be identical to that previously shown. For convenience, those elements in Figs. 7 and 9 shown which may be identical bear the same identification numerals. An indicator control switch identical to the switch 81 shown in Fig. 7 could be incorporated into the circuit of Fig. 9. It is not shown, however, in order to more clearly point up the distinguishing features of Fig. 9 over Fig. 7. In Fig. 9 as in Fig. 7, the output of the demodulator 41 is connected to filters 54, 56 and 90. Multi-contact switch 116 consists of switch levels 116a, 116b, 116c, 116d and 116e. There are seven contact positions on each level.

In the "off" or 0 position of switch 116, only level 116a is utilized; in this position the indicator 52 is connected to ground.

Switch position 1 is utilized for the "coarse bias adjustment." Indicator 52 is connected to the output of filter 56 by switch level 116a. Switch level 116b connects torquer 89 to the output of filter 90. As in Fig. 7, torquer 50 is connected directly to a source of variable direct-current potential comprising direct-current supplies 58a and 58b and potentiometer 59, and as described before, in the "coarse bias adjustment," a measurement of error torques is accomplished by energizing all portions of the gyro compass with the exception of the gyro rotor 20. The voltage from the pickoff 47 causes a current in the indicator 52 and a current in the torquer 89. The current in torquer 50 is then adjusted by means of the potentiometer 59 until the gyro pickoff signal goes to zero, at which time the indicator will also show zero, giving evidence that the current in torquer 89 is also zero.

Switch position 2 is utilized for the "coarse alinement adjustment." Switch level 116a bypasses resistor 88 thereby increasing the current in the indicator 52 for a given voltage in the output of the demodulator 49. As in the previously described embodiment, torquer 89 is disconnected from the circuit during this adjustment. Torquer 50 is connected to the output of the demodulator 49 through filter 54. The operation of the gyro compass for position 2 may be summarized as follows: A voltage from the gyro pickoff 47 causes a current in the indicator 52 and a current in torquer 50. The gyro case 26 is rotated in azimuth until a zero indication of the indicator 52 shows that no current is being provided to torquer 50 through filter 54.

For the "fine bias adjustment," switch positions 3 and 4 are used. In these positions, switch level 116a connects the indicator 52 to the output of filter 56. Torquer 89 is connected to the output of filter 90 via switch level 116b. However, a significant difference may be noted between Fig. 9 and Fig. 7 for these switch positions. For switch position 3 of Fig. 9, torquer 50 is connected to an additional source of direct-current voltage comprising direct-current supplies 58a and 58b, resistors 110, 112 and 117 and potentiometer 111. Potentiometer 111 is provided to store a setting indicative of the current necessary, in addition to that provided from potentiometer 59 through resistor 61, to balance the internal bias being measured for the particular direction of rotor spin plus the displacement caused by the earth rate. Switch levels 116d and 116e serve to energize rotor 20 for one direction of rotation. The operation of the gyro compass for position 3 may be summarized as follows: A voltage from the gyro pickoff will cause a current in the indicator 52 and also a current in torquer 89. Potentiometer 111 (by manual adjustment of its wiper arm) is used to adjust the current in torquer 50 until the current in torquer 89 is zero as shown by the indicator 52. The torque produced by torquer 50 thus exactly balances both the internal bias torque for this direction of rotor rotation and the displacement caused by the earth rate.

In switch position 4, the circuitry of Fig. 9 is changed in switch levels 116c, 116d and 116e from that of switch position 3. Torquer 50 is connected to another variable direct-current supply comprising supplies 58a and 58b, resistors 113, 115 and 118, and potentiometer 114. Resistors 61, 117 and 118 are chosen so that the current flowing in torquer 50 from potentiometer 59 is affected only a negligible amount by the currents from potentiometers 111 and 114. The rotation of rotor 20 is reversed by reversing two of the three phases supplied thereto in switch levels 116d and 116e. Potentiometer 114 is used to adjust the current in torquer 50 until the current in torquer 89 is zero as shown by the indicator. Thus, the potentiometer 114 provides a device for storing a setting indicative of the current required to balance both the bias torque in this direction of rotor momentum and the displacement caused by the earth rate. At this stage of operation, it may be noted that potentiometers 111 and 114 are adjusted to settings proportional to the torques required to cancel the bias torques for opposite directions of spin of the rotor 20 and also the earth rate displacement.

Position 5 of the multiposition switch 116 is used for the "final alinement adjustment." In this adjustment, the rotor case is adjusted so as to be very accurately alined with a true east-west cardinal azimuth. Switch levels 116a, 116b, 116d and 116e are unchanged from position 4. Switch level 116c, however, connects torquer 50 to the outputs of both potentiometer 111 and 114 through series connected resistors 120 and 119. The total current, therefore, in torquer 50 consists of a current from potentiometer 59 plus a combined current from potentiometers 111 and 114. The values of resistors 119 and 120 are so chosen that the net current in the torquer 50 is equal to the average of the two currents which flow through resistors 117 and 118 when switch 116 was in positions 3 and 4 respectively. A torque is now applied to the gimbal of the gyro so as to satisfy Equation 9; thus, the internal bias of the gyro has now been compensated to the required level. The gyroscope case may then be adjusted in azimuth until the current in torquer 89 is zero as shown by the indicator. The earth rate measured along the input axis is then zero and the input axis is alined to a very accurate east-west cardinal azimuth.

Switch position 6 provides a check on the correct operation and alinement of the instrument. This position is identical to that of position 5 with the exception that rotor 20 is operated in the opposite direction by means of switch levels 116d and 116e. If the instrument has been properly adjusted, the indicator will still read zero after switch 116 is switched from position 5 to position 6.

In essence, the circuit just described comprises a self-contained analog computer which provides for an automatic averaging of currents proportional to the measured error torques $\Delta M_1$ and $\Delta M_2$.

It will be seen that in each of the described embodiments, Figs. 3, 7 and 9, the effect due to error torques while the rotor is spinning is evaluated by applying about the output axis first and second torques while the gyro rotor is spinning in forward and reverse directions respectively. These torques may be the torque exerted by torquer 50 of Fig. 9 when energized by potentiometers 111 and 114, or the precessional torque exerted by the component of earth rotation about the input axis due to azimuthal displacement of said axis effected by gear 31, worm 32 and screw 33 of Fig. 3. In either case the torques are applied so as to zero displacement of the gimbal about the output axis as indicated by the pickoff 47 and meter 52. A final alinement adjustment can then be made to aline the gyro input axis to a very accurate east-west cardinal azimuth at which time there is no earth rate component in the direction of the gyro input axis. This final alinement step eliminates the effects of output axis disturbing torques by the application of a final torque determined by the average of the first and second torques applied with the rotor spinning in the forward and reverse spin directions. In the embodiments of Figs. 3 and 7 this final alinement step is achieved by rotating the gyro case by gear 31, worm 32 and screw 33 to the average of the two positions determined by the application of said first and second torques. In the embodiment of Fig. 9 the final alinement step is achieved by applying an average of the first and second torques by the torquer on the output axis of the gyro.

Heretofore, the adjustments in the position of the gyro case and adjustment of the potentiometers have been indicated to be manual. However, these adjustments could be performed by automatic equipment applied in a fashion well known in the art. In particular, since each step of the adjustment is governed by the indicator 52, and continued until it reads at a null, the current in the indicator could be used as the input to the servo-amplifier driving a servo-motor, which would perform each of the adjustments in turn via suitable coupling means.

This gyro compass may also be used to determine latitude on the earth. As hereinbefore described and shown in Fig. 2, the component of earth rate along the gyro input axis is proportional to $\cos \lambda$, $\lambda$ varying with the latitude. The latitude measurement is made after the true east-west direction is determined. The gyro case is rotated through exactly 90 degrees in azimuth from the true east-west position and a new setting of potentiometer 59 required to achieve zero current in torquer 89 (Figs. 7 or 9) is determined. The change in this setting is proportional to $\cos \lambda$.

The gyro compass of this invention has been described in terms of measuring a true east-west cardinal azimuth. Any other direction than the east-west line may be measured once the true east-west line is determined, by providing a known torque on the gyro gimbal. For this measurement, potentiometer 59 is adjusted by utilizing a predetermined scale factor relating dial setting to directional offset from an east-west line (for a given latitude). The condition of zero torque in torquer 89 is again sought, but when this condition is achieved, the gyro input axis is displaced from the true east-west cardinal azimuth by an amount and direction depending upon the amount and direction of the net torque applied to the gyro output axis by the potentiometer 59 in combination with torquer 50.

Although the invention has been described and illustrated in detail, it is to be clearly understood that the same is by way of illustration and example only and is not to be taken by way of limitation, the spirit and scope

We claim:

1. A gyro compass comprising a rotor, an earth-supported mounting; bearing means between said rotor and said mounting, means for causing said rotor to spin about an axis of rotation; means for detecting precession of said rotor in response to the component of earth rate about an input axis perpendicular to said axis of rotation; means for altering the rotational velocity of said rotor; and means for controlling the azimuth of said input axis under altered rotational velocities so as to evaluate the error torques acting on said rotor.

2. The combination recited in claim 1 wherein the means for altering the rotational velocity of said rotor comprises means for stopping said rotor.

3. The combination recited in claim 1 wherein the means for altering the rotational velocity of said rotor comprises means for reversing the directions of rotation of said rotor.

4. A gyro compass including a single degree of freedom gyroscope having a rotor adapted to be rotated in either direction, bearings supporting said rotor and defining the gyro spin axis, a gimbal mounting said rotor bearings and rotatably supported by bearings which define the gyro output axis; a gyro case supporting the bearings in which the gimbal is mounted; said gyroscope having an input axis defined as being orthogonal to both said spin axis and said output axis, means for mounting said gyroscope so as to constrain said input axis to be in a plane tangent to the geoid, means for detecting rotational displacement of the gimbal with respect to the case, means for measuring and applying torques to the gimbal about the output axis to balance the error torques acting on the gimbal about the output axis when the gyro rotor is rotating as well as when said rotor is non-rotating, and means for adjusting said gyro case in azimuth so as to aline said input axis with a true east-west cardinal azimuth.

5. Apparatus for determining direction or position by the operation of a gyro having input, output and rotor spin axes, means for constraining said input axis in alinement with the local earth horizontal, said apparatus comprising in combination with said gyro means for reversing the spin direction of the gyro rotor, means for detecting precession of said gyro caused by earth rotation and error torques acting on said gyro about said output axis for clockwise and counterclockwise directions of rotor spin, means for applying torques to said gyro for reducing said precession to zero for said clockwise and counterclockwise directions of rotor spin, means for indicating said applied torques, and means for applying a torque in accordance with said first applied torques for cancelling the effect of said error torques.

6. Apparatus for determining direction or position by the operation of a gyro having input, output and rotor spin axes, means for constraining said input axis in alinement with the local earth horizontal, said apparatus comprising in combination with said gyro means for reversing the spin direction of the gyro rotor, means for detecting precession of said gyro caused by earth rotation and error torques acting on said gyro about said output axis for clockwise and counterclockwise directions of rotor spin, means for applying torques to said gyro for reducing said precession to zero for said clockwise and counterclockwise directions of rotor spin, means for indicating said applied torques, and means for applying a torque in accordance with said first applied torques for cancelling the effect of said error torques, said gyro including a gyro case, said means for applying torques comprising means for adjusting the gyro case in azimuth.

7. A gyro compass as defined in claim 5 wherein said gyro includes a gimbal rotatably mounted about said output axis and wherein said means for applying said torques comprises torquer means on said output axis for applying a torque to said gimbal about said output axis.

8. In a gyro compass, a gyro, means for vertically mounting the axis of precession of said gyro, a support mounting said gyro for rotation about an axis parallel to said precession axis, means including a pickoff on said gyro for storing signals indicative of error torques acting on said gyro about said precession axis, means responsive to said storing means for torquing said gyro about said precession axis in opposition to said error torques, and means for adjusting said torqued gyro relative to said support in a sense to decrease output axis precession caused by rotation of said support about a horizontal.

9. The gyro compass defined in claim 8 wherein said pickoff detects precession of said gyro caused by earth rotation and additional error torques acting on said gyro about said precession axis for clockwise and counterclockwise directions of rotor spin and which includes means for applying first torques to said gyro for reducing said precession to zero for said clockwise and counterclockwise directions of rotor spin and for applying another torque in accordance with said first torques for cancelling the effect of said additional error torques.

10. A method for determining direction or position comprising the operation of an earth supported gyro having a rotor, and input, output and spin axes therefor, said rotor output and input axes being constrained in alinement with the local earth vertical and horizontal, respectively, said method comprising the steps of coarsely alining said gyro with its input axis along a line having a known relation to east-west, applying to said gyro about its output axis a first torque sufficient to zero output axis precession rate while said rotor is spinning in a forward direction, applying to said gyro about its output axis a second torque sufficient to zero output axis precession rate while said rotor is spinning in a reverse direction, and angularly displacing said gyro about said output axis an amount sufficient to zero output axis precession rate due to earth rotation, said last mentioned step including applying to said gyro about its output axis a third torque in accordance with the average of said first and second torques.

11. The method for determining direction or position as defined in claim 10 wherein said steps of applying said first, second and third torques comprise adjusting said gyro in azimuth about said output axis.

12. The method for determining direction or position as defined in claim 10 wherein said gyro includes a torquer means on said output axis, and steps of applying said first, second and third torques comprising energizing said torquer means.

13. A method of operating a gyro having an input axis constrained to be in a plane tangent to the geoid to determine azimuth direction on earth, and output axis, and means for detecting displacement of said gyro about said output axis from a null position, said method comprising the steps of measuring the displacement of the gyro about its output axis from a null position when the gyro rotor is non-rotating, applying a first torque to said gyro about said output axis throughout the succeeding steps to cancel the measured displacement about said output axis while the gyro rotor is non-rotating, rotating the rotor, and adjusting the gyro in azimuth about said output axis until the measured displacement of the gyro about said output axis is zero whereby said input axis is substantially alined with a desired azimuth direction.

14. A method for determinging azimuth direction on earth with a gyroscope having a gimbal mounted on bearings which define an output axis, a rotor adapted for rotation in opposite spin directions, said output axis mounted parallel to an earth vertical, and an input axis to be aligned with the desired azimuth direction comprising the following steps: applying a torque to said gimbal about said output axis during the succeeding steps to cancel displacement of the gimbal about said output axis when said rotor is non-rotating, rotating said rotor in one direction and applying a torque to the gimbal to cancel precession of the gimbal about said output axis, rotating said rotor in the opposite direction and applying a torque to the gimbal to cancel precession of the gimbal about said output axis, applying a torque to the gimbal about said output axis which is the average of the torques applied for respectively opposite spin directions, and adjusting the gyroscope in azimuth while so torqued with said average torque until the precession of the gimbal about said output axis is zero.

15. A gyro compass comprising a gyro having an input axis, a gyro case, a gimbal rotatably supported by said gyro case about an output axis, a rotor rotatably mounted on said gimbal, and means for mounting said gyro so as to constrain said input axis in a plane tangent to the geoid, means for detecting displacement of the gimbal with respect to said case about said output axis and generating a signal output indicative of the magnitude and direction of said displacement, indicator means responsive to said signal, a first torque-producing means adapted to torque said gimbal about said output axis, a second torque-producing means adapted to torque said gimbal about said output axis, means conntected to receive an output of said detecting means for selectively operating said first torque-producing means whereby the case of said gyro may be adjusted in azimuth to null said signal as indicated by said indicator thereby approximately alining said gyroscope input axis with a true east-west cardinal azimuth, and means connected to receive an output of said displacement detecting means for selectively operating said second torque-producing means so that the error torques acting on said gimbal about said output axis when said gyroscope rotor is non-rotating and other error torques acting on said gimbal about said output axis when said gyroscope rotor is being rotated may be detected by said means for detecting displacement of the gimbal with respect to the case.

16. The gyro compass as defined in claim 15 wherein said first torque-producing means produces a relatively large torque for a given input, and said second torque-producing means produces a relatively small torque for said given input.

17. The gyro compass as defined in claim 16 wherein said first and second torque-producing means comprise a torquer and a resistor selectively connected in and out of series circuit with said torquer, the respective circuit depending on whether said second or first torque-producing means is required.

18. The gyro compass as defined in claim 16 wherein said first torque-producing means comprises an electrical torquer adapted to apply a relatively large amount of torque for a given electrical input to said gimbal about said output axis, and said second torque-producing means comprises an electrical torquer adapted to apply a relatively small amount of torque for said given electrical input to said gimbal about said output axis.

19. A gyro compass comprising a gyro having a gyro case, a gimbal rotatably supported by said gyro case, and a rotor rotatably mounted on said gimbal, means for detecting displacement of the gimbal with respect to said case and generating an output signal indicative of the magnitude and direction of said displacement, indicator means, a resistor having the same resistance as said indicator means, means connected to said indicator means for selectively connecting said indicator means to the output of said signal generating means whenever a measure of said displacement is desired and for disconnecting said indicator means from the output of said signal generating means and substituting said resistor whenever external adjustments are made on said gyro case or whenever the angular momentum of the rotor is changed.

20. A gyro compass comprising a gyro having an input axis, a gyro case, a gimbal rotatably supported by said gyro case about an output axis, and means for mounting said gyro so as to constrain said input axis in a plane tangent to the geoid; an electrical pickoff connected to both said gyro case and said gyro gimbal for detecting displacement of the gimbal with respect to said case about said output axis and generating an alternating signal indicative of the magnitude and direction of said displacement; an amplifier connected to receive said alternating signal; a demodulator connected to the output of said amplifier for obtaining a direct current signal having a magnitude proportional to said displacement and a sign indicative of the direction of said displacement; a series circuit including a noise filter and indicator connected to the output of said demodulator; a servo loop connected to the output of said demodulator including another filter adjusted for optimum dynamic response of said servo loop, a resistor, and an electrical torquer adapted to torque said gimbal about said output axis; a switch connected in shunt with said resistor to selectively provide a low and high resolution torquer; and a reference source of direct current connected to said electrical torquer.

21. A gyro compass comprising a gyro having an input axis a gyro case, a gimbal rotatably supported by said gyro case about an output axis, and means for mounting said gyro so as to constrain said input axis in a plane tangent to the geoid; an electrical pickoff connected to both said gyro case and said gyro gimbal for detecting displacement of the gimbal with respect to said case about said output axis and generating an alternating signal indicative of the magnitude and direction of said displacement; an amplifier connected to receive said alternating signal; a demodulator connected to the output of said amplifier for obtaining a direct-current signal having a magnitude proportional to said displacement and a sign indicative of the direction of said displacement; a series circuit including a noise filter and indicator connected to the output of said demodulator; first and second filters connected to the output of said demodulator; a high resolution torquer selectively connected to said first filter thereby forming a first servo loop; a low resolution torquer selectively connected to the output of said second filter thereby forming a second servo loop; said filters being adjusted for optimum response of the respective servo loops in which they are connected; a variable reference source of direct current connected to said low resolution torquer; said high and low resolution torquers connected to said gimbal and adapted to torque said gimbal about said output axis; and a switch suitably connected to reverse the spin direction of said rotor or to stop the spin thereof.

22. A gyro compass comprising a gyro having an input axis, a gyro case, a gimbal rotatably supported by said gyro case about an output axis, and means for mounting said gyro so as to constrain said input axis in a plane tangent to the geoid; an electrical pickoff connected to both said gyro case and said gyro gimbal for detecting displacement of the gimbal with respect to said case about said output axis and generating an alternating signal indicative of the magnitude and direction of said displacement; an amplifier connected to receive said alternating signal; a demodulator connected to the output of said amplifier for obtaining a direct-current signal having a magnitude proportional to said displacement and a sign indicative of the direction of said displacement; a series circuit including a noise filter and indicator connected to the output of said demodulator; first and second filters connected to the output of said demodulator; a high resolution torquer selectively connected to said first filter thereby forming a first servo loop; a low resolution torquer selectively connected to the output of said second filter thereby forming a second servo loop; said filters being adjusted for optimum response of the respective servo loops in which they are connected; a first variable reference source of direct current connected to said low resolution torquer and adapted to store a measure of current required to reduce displacement of the gyro gimbal with respect to the case; a second variable reference source of direct current selectively connected to said low resolution torquer and adapted to store a measure of the current required to reduce precession about the output axis for a clockwise direction of rotor spin; a third variable reference source of direct current selectively connected to said low resolution torquer and adapted to store a measure of the current required to reduce the precession of said gimbal about said output axis for a counter-clockwise direction of rotor spin; resistive means avis for a counter-clockwise direction of rotor spin; resistive means connected to the outputs of said second and third variable reference sources for obtaining an average of the current measurements stored by said sources and selectively connected to the output of said low resolution torquer thereby cancelling error torques acting on said gimbal about said output axis.

23. A method for determining latitude on the earth comprising the operation of a gyro compass having an input axis constrained to lie in a plane tangent to the geoid, said gyro compass including a gyro adapted to sense the space rate of said gyro about said input axis, said method comprising the steps of adjusting said gyro to a first azimuth position wherein the space rate of rotation sensed by the gyro is zero, adjusting said gyro to a second azimuth position displaced 90° in azimuth from said first azimuth position, and measuring the space rate of rotation in said second azimuth position.

24. A method for determining a predetermined direction on earth comprising the operation of a gyro compass having an input axis constrained to lie in a plane tangent to the geoid, said gyro compass including a gyro adapted to sense the space rate of said gyro about said input axis and precessing about a precession axis in accordance therewith, said method comprising the steps of adjusting said gyro to a first azimuth position wherein the precession of the gyro is zero, applying a torque to said gyro about said gyro precession axis, the magnitude of said torque being determined by the latitude of said gyro compass and the desired offset from true east-west, and adjusting said gyro to a second azimuth position wherein the precession of the gyro is zero, said second azimuth position being the desired predetermined direction.

25. A method for determining direction or position comprising the operation of an earth supported gyro having a rotor, and input and output axes, said input axis being constrained in alinement with the local earth horizontal, said method comprising the steps of applying to said gyro about its output axis a first torque sufficient to zero output axis precession rate while said rotor is spinning in a forward direction and applying to said gyro about its output axis a second torque sufficient to zero output axis precession rate while said rotor is spinning in a reverse direction.

26. A gyro compass including a gyro having input, output and spin axes, means for constraining said input axis to lie in a plane tangent to the geoid, and means for measuring the torque about the output axis which when added to the error torque acting about the output axis balances the precessional torque about the output axis caused by the component of earth rate about said input axis.

References Cited in the file of this patent

UNITED STATES PATENTS

| 1,031,769 | Barr et al. | July 9, 1912 |
| 1,980,886 | Talafre et al. | Nov. 13, 1934 |
| 2,432,613 | Fedde | Dec. 16, 1947 |
| 2,484,423 | Hammond | Oct. 18, 1949 |
| 2,752,792 | Draper et al. | July 3, 1956 |
| 2,902,772 | Ciscel | Sept. 8, 1959 |

UNITED STATES PATENT OFFICE
CERTIFICATE OF CORRECTION

Patent No. 2,972,195                        February 21, 1961

Mark E. Campbell et al.

It is hereby certified that error appears in the above numbered patent requiring correction and that the said Letters Patent should read as corrected below.

Column 17, lines 14 and 15, strike out "resistive means avis for a counter-clockwise direction of rotor spin;".

Signed and sealed this 19th day of September 1961.

(SEAL)
Attest:

ERNEST W. SWIDER                               DAVID L. LADD
Attesting Officer                                    Commissioner of Patents
                                                                           USCOMM-DC